(12) United States Patent
Martel et al.

(10) Patent No.: US 8,092,145 B2
(45) Date of Patent: Jan. 10, 2012

(54) PARTICLE SEPARATOR AND SEPARATING METHOD FOR GAS TURBINE ENGINE

(75) Inventors: Alain C. Martel, St-Paul d'Abbotsford (CA); Eugene Gekht, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 615 days.

(21) Appl. No.: 12/259,602

(22) Filed: Oct. 28, 2008

(65) Prior Publication Data

US 2010/0104422 A1 Apr. 29, 2010

(51) Int. Cl.
*F04D 27/00* (2006.01)
*F04D 29/44* (2006.01)

(52) U.S. Cl. ............... 415/1; 415/121.2; 415/169.1
(58) Field of Classification Search ............ 415/121.2, 415/144, 169.1
See application file for complete search history.

(56) References Cited

U.S. PATENT DOCUMENTS

| | | | |
|---|---|---|---|
| 3,673,771 A | 7/1972 | Dickey | |
| 3,751,907 A | 8/1973 | Anderson | |
| 3,993,463 A | 11/1976 | Barr | |
| 4,304,094 A | 12/1981 | Amelio | |
| 4,798,047 A | 1/1989 | Geary | |
| 4,881,367 A | 11/1989 | Flatman | |
| 4,928,480 A * | 5/1990 | Oliver et al. | 60/39.092 |
| 5,431,535 A | 7/1995 | Klujber | |
| 5,531,565 A | 7/1996 | Meindl et al. | |
| 5,558,496 A | 9/1996 | Woodmansee et al. | |
| 5,586,859 A | 12/1996 | Nolcheff | |
| 5,857,833 A | 1/1999 | Dev | |
| 6,428,271 B1 | 8/2002 | Ress, Jr. et al. | |
| 6,619,914 B2 | 9/2003 | Yokoyama et al. | |
| 6,863,494 B2 | 3/2005 | Coppola | |
| 7,137,777 B2 * | 11/2006 | Fried et al. | 415/115 |
| 7,658,061 B2 * | 2/2010 | Kawamoto et al. | 60/39.092 |
| 2007/0048124 A1 | 3/2007 | Silverman et al. | |

* cited by examiner

*Primary Examiner* — Benjamin Sandvik
*Assistant Examiner* — Joseph Schoenholtz
(74) *Attorney, Agent, or Firm* — Norton Rose OR LLP

(57) ABSTRACT

A system and method for particle separation in a gas turbine engine centrifugal impeller bleed air system using a tangential velocity component of the compressor bleed air to centrifuge the particles radially outwardly and convey the particles circumferentially, away from a clean air outlet and towards a particle outlet where the particles are extracted from the bleed air.

15 Claims, 4 Drawing Sheets

PARTICLE SEPARATOR AND SEPARATING METHOD FOR GAS TURBINE ENGINE

TECHNICAL FIELD

The technical field relates generally to gas turbine engines, and more particularly to the separation or removal of particles from the bleed air prior to use thereof.

BACKGROUND

In many gas turbine engines, a secondary stream of air is extracted, or "bled", from the main stream, typically in the cold section, for various uses. For example, in some engines, a secondary stream of cold, low-pressure air is extracted from the gas path of the compressor impeller, through a compressor shroud, and is used to pressurize and provide the air to the bearing cavities. When such engines are used in harsh environments, particles such as dust, sand or the like may be present in the main stream and the secondary bleed air stream, which is undesirable. Improvement is thus sought.

SUMMARY

There is provided a particle separator for a gas turbine engine, comprising a generally toroidal cavity defined within a casing surrounding a compressor impeller gas path and being in gas flow communication therewith through a plurality of circumferentially interspaced bleed apertures formed in said casing, the cavity being funnel-shaped such as to define a radially outer narrow tip circumferentially extending about the cavity, at least one clean air outlet being disposed in communication with the cavity and located radially inwardly from the radially outer narrow tip thereof, and a particle outlet radially located at the narrow tip, the bleed apertures allowing bleed air from the compressor impeller gas path to flow into the cavity, during operation of the gas turbine engine, with a tangential velocity component sufficient to at least partially centrifuge particles present within the bleed air into the radially outer narrow tip of said cavity and convey the particles circumferentially thereabout to the particle outlet, wherein air flowing out from the clean air outlet is thereby substantially free of particles.

There is also provided a gas turbine engine having a compressor rotor rotatable about a main longitudinal axis of the engine and housed in a compressor case, the compressor case at least partially defined therewithin a toroidal internal cavity surrounding a gas path of the compressor, the compressor case having a plurality of circumferentially interspaced bleed apertures therein which provide gas flow communication between the gas path and the cavity, the compressor case having an air outlet in gas flow communication for extracting clean air therefrom, wherein the cavity funnels radially outward to a circumferentially extending narrow tip and the bleed apertures are oriented at a tangentially extending angle relative to said main longitudinal axis to allow a tangential velocity component of the bleed air entering the cavity via said apertures during operation of the gas turbine engine to centrifuge particles present in the bleed air radially outward towards the circumferentially extending narrow tip of the cavity and to convey the particles circumferentially thereabout to a particle outlet, the air outlet being positioned radially inwardly from the narrow tip of the cavity.

There is further provided a method of separating particles from air during operation of a gas turbine engine, the method comprising: extracting bleed air from a compressor gas path into a generally toroidal cavity surrounding the gas path via a plurality of circumferentially interspaced apertures oriented such as to maximize a tangential velocity of the bleed air in said cavity; centrifuging particles radially outwardly into a channel formed in the cavity using the tangential velocity of the bleed air flowing within said cavity, and maintaining a circumferential flow of the bleed air in the cavity to circumferentially convey the particles about the channel to a particle exit; extracting the particles from within the channel of the cavity via the particle exit; and extracting clear air from the cavity via a clean air exit, the clean air being substantially free from the particles.

BRIEF DESCRIPTION OF THE DRAWINGS

Further features will become apparent from the following detailed description, taken in combination with the appended drawings, in which.

DETAILED DESCRIPTION

Figure 1:
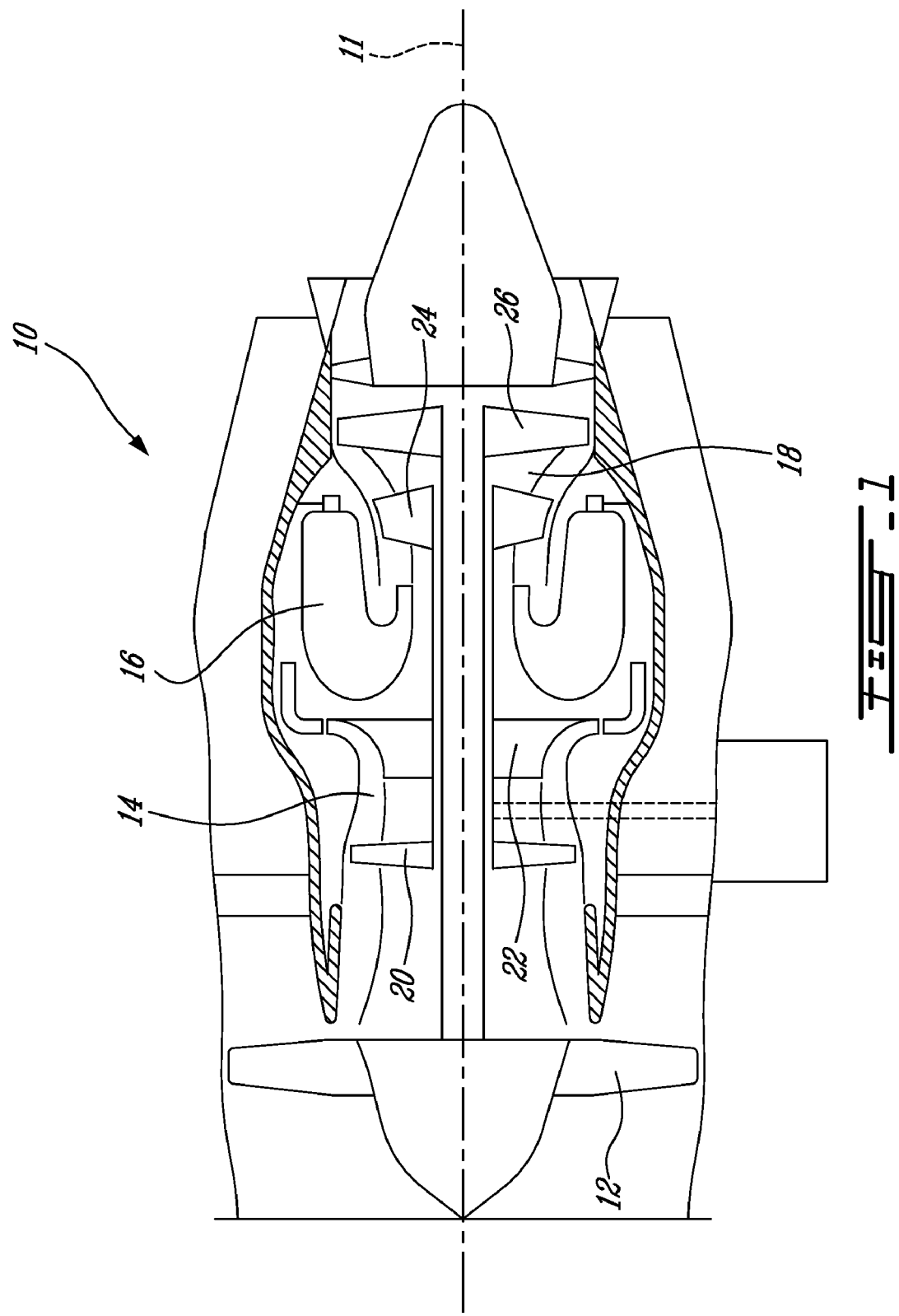
FIG. 1 is schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

More particularly, in this example, the multi-stage compressor 14 includes a low-pressure compressor 20 and a high-pressure compressor 22, whereas the multistage turbine 18 includes a high-pressure turbine 24 and a low-pressure turbine 26. The low-pressure compressor 20 is connected to the low-pressure turbine 26 and the high pressure compressor 22 is connected to the high-pressure turbine 24. In the gas turbine engine illustrated in FIG. 1, the low-pressure compressor 20 is of the axial compressor type, whereas the high-pressure compressor 22 is of the centrifugal type.

Figure 2:
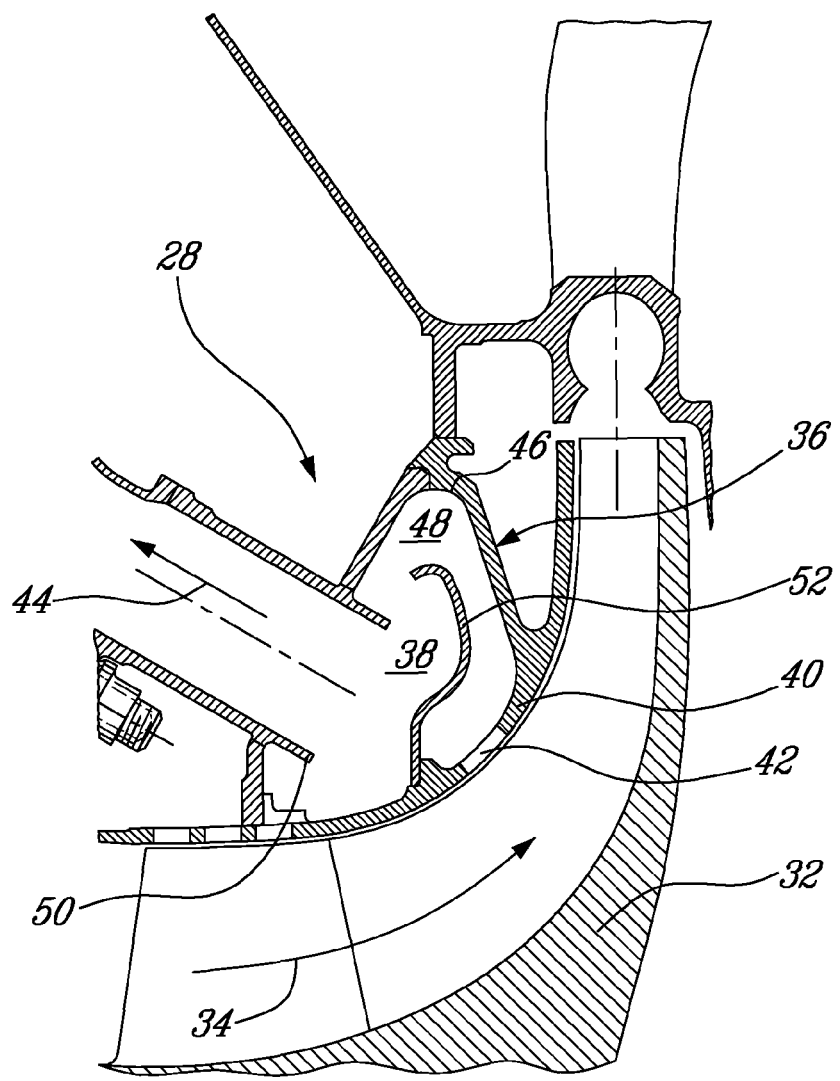
FIG. 2 is a cross-sectional view showing an upper portion of a compressor case.

FIG. 2 illustrates a particle separator 28 for such a gas turbine engine 10. More particularly, FIG. 2 partially shows a compressor 30 of the centrifugal type and which has an impeller 32 with a primary gas path 34. The impeller 32 is surrounded by a compressor case 36 which at least partially defines a cavity 38, generally shaped as a toroid, therein. The cavity 38 surrounds the gas path 34. The compressor case 36 has a compressor shroud portion 40 adjacent the impeller 32, and includes a plurality of circumferentially interspaced bleed apertures 42 (only one is shown in FIG. 2). The bleed apertures 42 allow gas flow communication between the primary gas path 34 and the cavity 38, and thereby allow extracting a secondary bleed flow of air 44, which can be used elsewhere in the engine.

During operation of the engine, particles such as sand, dirt or the like which are ingested into the engine can be transferred into the cavity 38 through the bleed apertures 42. In this example, the bleed apertures 42 are configured (such as in size, shape, orientation and/or location) to allow a substantial tangential velocity component of the air from the primary gas path 34 to flow into the cavity 38. The cavity 38 being circumferential to the impeller 32, a swirl movement of air, or circular motion of air (around the main axis 11), can be imparted inside the cavity 38 and maintained by the kinetic energy of the tangential velocity component allowed therein. The circular movement of air is used to centrifuge particles which enter the cavity 38 through the bleed apertures 42 radially outwardly, and to convey the particles circumferentially around inside the compressor case 36.

The particle separator 28 allows bleed air having a significant tangential velocity component to flow into the cavity 38 formed within the compressor case, and is used, in combination with case geometry, to centrifuge the particles radially outwardly and convey the particles circumferentially, away from a clean air outlet, but towards a particle outlet where the particles can be collected and evacuated.

More particularly, in this example, the cavity 38 funnels radially-outwardly to a narrow circumferential tip 46. The narrow circumferential tip 46 acts as a channel 48 for the particles as they are circumferentially conveyed around the cavity 38. A clean air outlet 50 of the cavity 38 is provided at a radial position recessed inwardly from the channel 48, such that clean air (i.e. air from which particles have been separated and removed) can be extracted from the particle separator 28 for use elsewhere in the engine. The clean air outlet 50 has a re-entrant edge. An annular baffle plate 52 extends radially outwardly into the cavity 38 from a location adjacent the bleed apertures 42 on the compressor shroud portion 40 of the compressor case 36, toward the narrow circumferential tip 46 of the cavity 38, and contributes to guide particles ingested through the bleed apertures 42 toward the channel 48. The baffle can also prevent particles from passing directly from the bleed apertures 42 to the clean air outlet 50 by forcing airflow around the baffle, to a radially outward portion 48 of the cavity 38.

Figure 3:
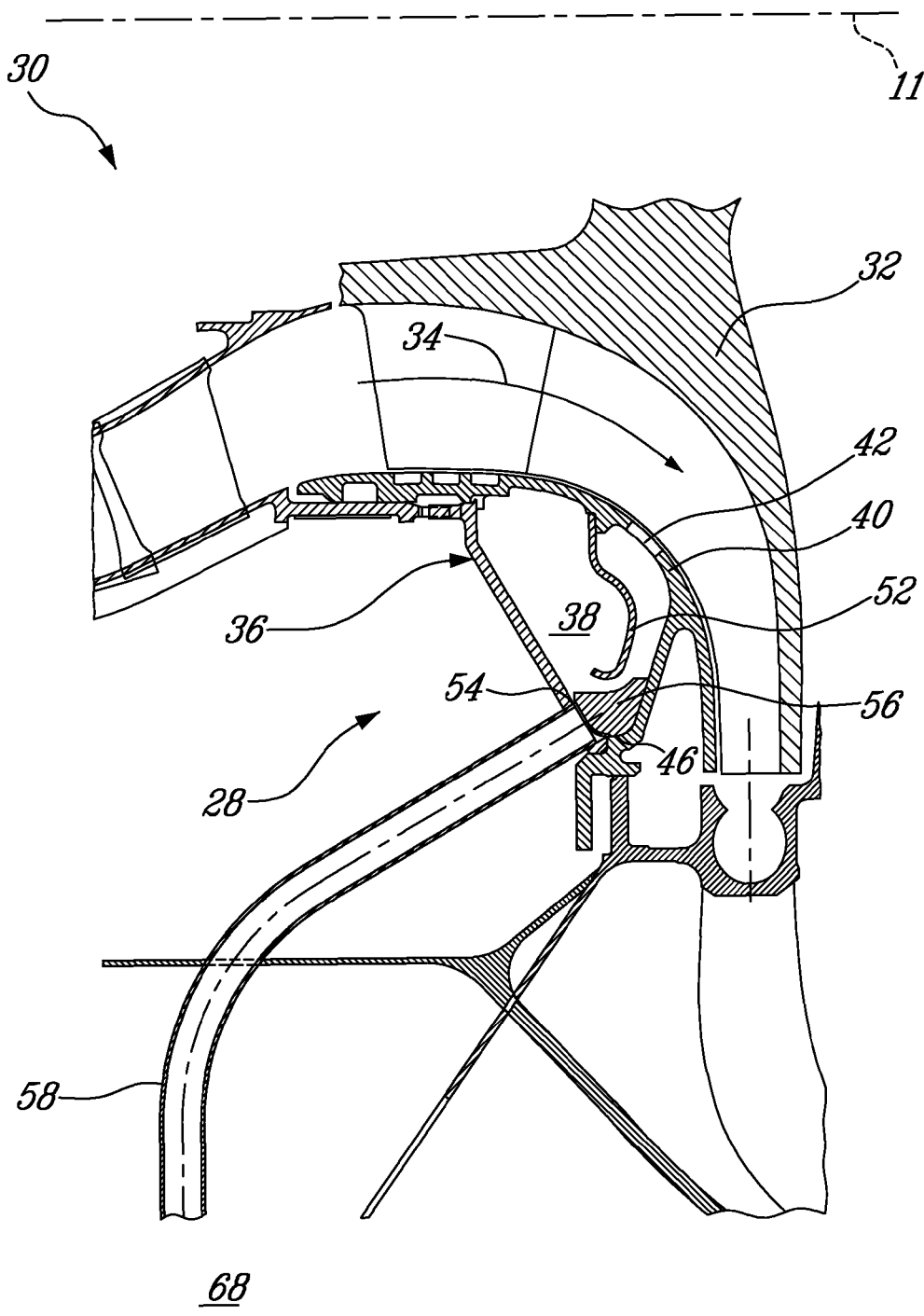
FIG. 3 is a cross-sectional view showing a lower portion of a compressor case.

Turning to FIG. 3, as the particles are conveyed circumferentially about the channel 48 formed by the narrow circumferential tip 46, they eventually reach a particle outlet 54 provided therein. In this example, the particle outlet 54 is provided through a lower portion of the compressor case 36, more particularly at the circumferential bottom thereof. and the particle outlet 54 is provided in combination with a particle scoop, or catch, 56 which is tangentially oriented toward the incoming flow of particles, which thereby impinge thereon, and are subsequently guided into the particle outlet 54. In this example, a tubular channel 58 connects the particle outlet 54 to the atmosphere 60, where the particles can be evacuated. In this example, a portion of the air is evacuated with the particles through the particle outlet 54. This portion of lost bleed air is however small relative to the amount of air extracted from the clean air outlet 50 (FIG. 2).

Figure 4:
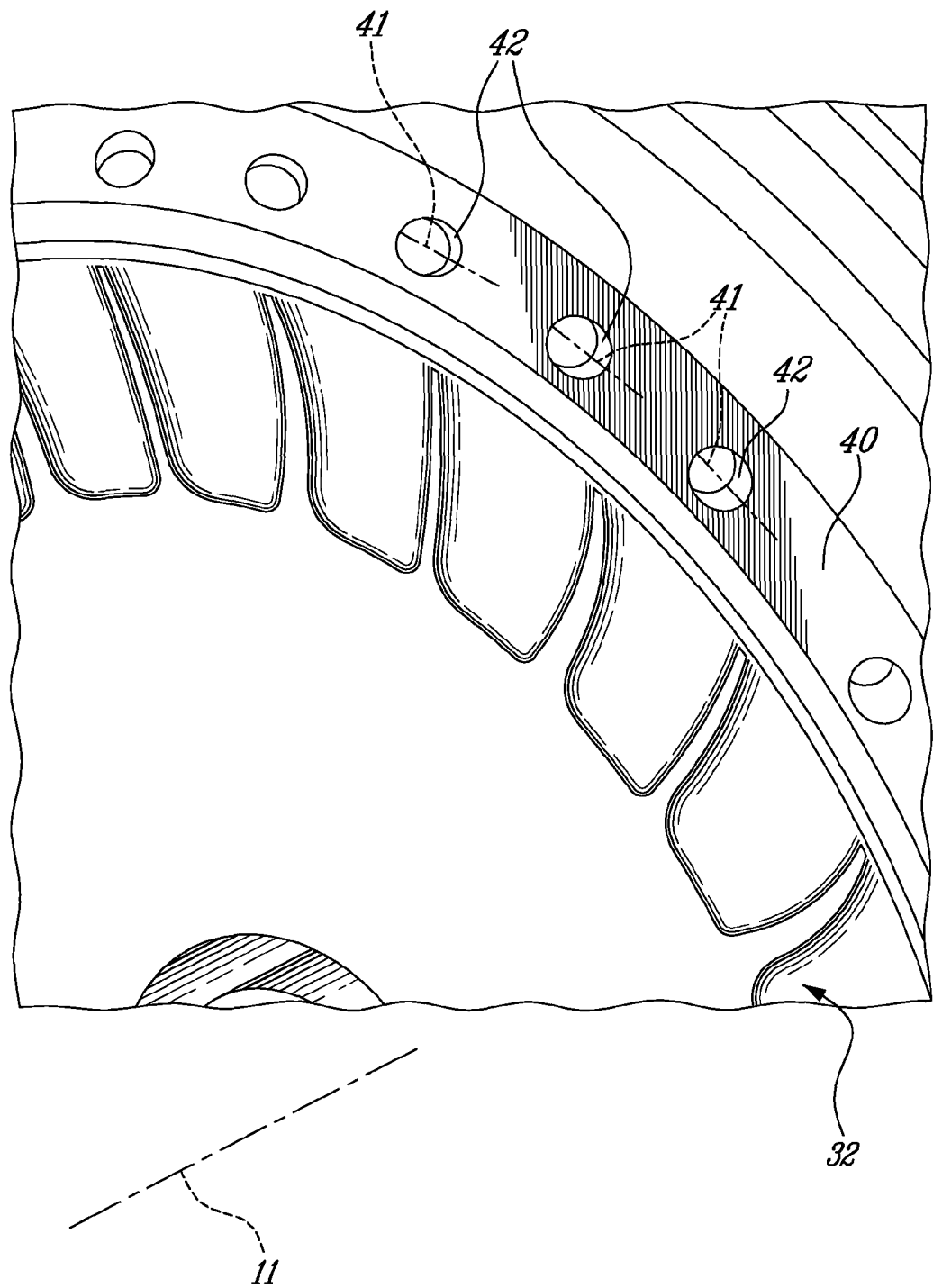
FIG. 4 is a perspective view showing bleed apertures through the compressor case.

One way to allow a satisfactory amount of a tangential velocity component of the air flowing through the bleed apertures 42, is to slant or angle the bleed apertures 42 in the case relative to the longitudinal direction. FIG. 4 illustrates an example of slanted bleed apertures 42 in greater detail, wherein each of the bleed apertures 42 defines an aperture axis 41 that is angled in the casing 40 relative to the longitudinal axis 11 of the engine 10 and thereof of the impeller 32.

In one possible embodiment, the bleed apertures 42 in the casing 40 are tangentially slanted/angled relative to the longitudinal axis 11.

Hence, in use, airflow from the impeller gas path having a significant tangential velocity component is allowed to flow into the annular cavity surrounding the impeller gas path, via a plurality of circumferentially interspaced apertures. The tangential velocity of the bleed air allowed into the cavity imparts and maintains a circumferential flow of air in the toroidal shaped cavity, which centrifuges particles ingested therein outward towards a radially inwardly facing channel surrounding the cavity, and about which the particles are conveyed by the air movement to an extraction point, where the separated particles are extracted from the rest of the bleed air flow. The particles can thus be substantially separated from the secondary flow of air, such that this secondary air flow is substantially free from particles and can then be extracted from the cavity and re-directed for use elsewhere in the engine.

It will be understood that the example given above and illustrated is provided for illustrative purposes only. Alternate embodiments of the invention, or variants thereof, can depart from this example. For instance, instead of being applied to a centrifugal compressor, the particle separator can be applied to an axial compressor, although an axial compressor may have a lesser tangential velocity component than a centrifugal compressor, and that this may adversely affect separation efficiency. Also, more than one clean air outlet, or particle outlet, can be used in alternate embodiments. Although the clean air outlet was in the upper portion of the compressor case and the particle outlet was in the bottom of the compressor case in the example above, clean air outlets or particle outlets can alternately be provided at other angular positions. The annular baffle is optional but can help increasing separation efficiency, and its exact configuration can be modified as required in alternate embodiments. Variants to the shape, configuration, and relative position of the bleed apertures illustrated herein can be used in alternate embodiments. Further, in alternate embodiments, variants to the generally inverted "V" shape of the radially outwardly funnelling cavity can be used.

For many applications, a separation efficiency above 95% will be judged satisfactory. A separation efficiency of above 90% or above 70% can also be satisfactory for some applications. Nonetheless, even a separation efficiency lower than 70% can be satisfactory for some applications.

Those skilled in the art will therefore appreciate that the forgoing description is illustrative only, and that various other alternatives and modifications can be devised without departing from the spirit of the present invention as defined by the appended claims. Accordingly, the present is intended to embrace all such alternatives, modifications and variances which fall within the scope of the appended claims.

The invention claimed is:

1. A particle separator for a gas turbine engine having a central longitudinal axis, comprising a generally toroidal cavity defined within a casing surrounding a compressor impeller gas path and being in gas flow communication therewith through a plurality of circumferentially interspaced bleed apertures formed in said casing, the cavity being funnel-shaped such as to define a radially outer narrow tip circumferentially extending about the cavity, at least one clean air outlet being disposed in communication with the cavity and located radially inwardly from the radially outer narrow tip thereof, and a particle outlet radially located in a circumferential lower portion of the radially outer narrow tip of the cavity, the circumferential lower portion being disposed below the central longitudinal axis of the gas turbine engine in a normal flying attitude, the bleed apertures allowing bleed air from the compressor impeller gas path to flow into the cavity, during operation of the gas turbine engine, with a tangential velocity component sufficient to at least partially centrifuge particles present within the bleed air into the radially outer narrow tip of said cavity and convey the particles circumferentially thereabout to the particle outlet, wherein air flowing out from the clean air outlet is thereby substantially free of particles.

2. The particle separator of claim 1 wherein the bleed apertures are tangentially oriented within the casing.

3. The particle separator of claim 1 further comprising an annular baffle extending radially outwardly into the cavity, the annular baffle being longitudinally adjacent the bleed apertures and disposed between the bleed apertures the clean air outlet.

4. The particle separator of claim 1 wherein a tangentially facing scoop is disposed within the cavity proximate the particle outlet and oriented to receive incoming particles such as to guide incoming particles through the particle outlet.

5. A gas turbine engine having a compressor rotor rotatable about a main longitudinal axis of the engine and housed in a compressor case, the compressor case at least partially defined therewithin a toroidal internal cavity surrounding a gas path of the compressor, the compressor case having a plurality of circumferentially interspaced bleed apertures therein which provide gas flow communication between the gas path and the cavity, the compressor case having an air outlet in gas flow communication for extracting clean air therefrom, wherein the cavity funnels radially outward to a circumferentially extending narrow tip and the bleed apertures are oriented at a tangentially extending angle relative to said main longitudinal axis to allow a tangential velocity component of the bleed air entering the cavity via said apertures during operation of the gas turbine engine to centrifuge particles present in the bleed air radially outward towards the circumferentially extending narrow tip of the cavity and to convey the particles circumferentially thereabout to a particle outlet, the air outlet being positioned radially inwardly from the narrow tip of the cavity.

6. The gas turbine engine of claim 5, further comprising an annular baffle plate connected to a compressor shroud portion of the compressor case adjacent the bleed apertures, the baffle plate extending radially outwardly from the compressor shroud portion toward the narrow tip of the cavity, between the bleed apertures and the air outlet.

7. The gas turbine engine of claim 5, wherein the air outlet is positioned in an upper portion of the compressor case.

8. The gas turbine engine of claim 5, wherein the particle outlet positioned in a circumferential bottom portion of the compressor case.

9. The gas turbine engine of claim 7, further comprising a catch plate connected to the compressor case in the narrow radially-outward tip of the cavity, adjacent the particle outlet and angled with respect to the tangential velocity component of the bleed air, to guide the centrifuged particles into the particle outlet.

10. The gas turbine engine of claim 7, wherein the compressor is a centrifugal compressor and the rotor is an impeller.

11. A method of separating particles from air during operation of a gas turbine engine, the method comprising:
    extracting bleed air from a compressor gas path into a generally toroidal cavity surrounding the gas path via a plurality of circumferentially interspaced apertures oriented such as to maximize a tangential velocity of the bleed air in said cavity;
    centrifuging particles radially outwardly into a channel formed in the cavity using the tangential velocity of the bleed air flowing within said cavity, and maintaining a circumferential flow of the bleed air in the cavity to circumferentially convey the particles about the channel to a particle exit;
    extracting the particles from within the channel of the cavity via the particle exit; and
    extracting clear air from the cavity via a clean air exit, the clean air being substantially free from the particles.

12. The method of claim 11, further comprising preventing the bleed air from passing directly from the inlet apertures to the clean air outlet of the cavity without first being circumferentially redirected.

13. The method of claim 11, wherein the step of extracting the particles includes evacuating a quantity of the bleed air with the particles.

14. The method of claim 11, wherein the step of extracting the clean air includes extracting the clean air from a location within the cavity that is recessed radially inwardly from the channel.

15. The particle separator of claim 1, wherein the circumferential lower portion of the radially outer narrow tip of the cavity is disposed at a circumferential bottom of the casing surrounding the compressor impeller gas path.

* * * * *